(12) United States Patent
Hirokawa et al.

(10) Patent No.: US 12,337,518 B2
(45) Date of Patent: Jun. 24, 2025

(54) METHOD FOR PRODUCING AN EXTRUSION MOLDED PRODUCT

(71) Applicant: Tokiwa Chemical Industries Co., Ltd., Chiba (JP)

(72) Inventors: Takashi Hirokawa, Chiba (JP); Naohisa Miyakawa, Chiba (JP)

(73) Assignee: TOKIWA CHEMICAL INDUSTRIES CO., LTD., Chiba (JP)

( * ) Notice: Subject to any disclaimer, the term of this patent is extended or adjusted under 35 U.S.C. 154(b) by 170 days.

(21) Appl. No.: 18/225,256

(22) Filed: Jul. 24, 2023

(65) Prior Publication Data

US 2024/0286336 A1   Aug. 29, 2024

(51) Int. Cl.
*B29C 48/00* (2019.01)
*B26D 3/06* (2006.01)
*B29C 48/12* (2019.01)

(52) U.S. Cl.
CPC ............ *B29C 48/0022* (2019.02); *B26D 3/06* (2013.01); *B29C 48/12* (2019.02); *B29C 2793/0054* (2013.01)

(58) Field of Classification Search
CPC .................................................. B29C 48/0022
See application file for complete search history.

(56) References Cited

U.S. PATENT DOCUMENTS

| 7,459,111 B2 * | 12/2008 | Miyakawa | B29C 48/12 |
| | | | 425/315 |
| 8,479,451 B2 * | 7/2013 | Miyakawa | B60J 10/80 |
| | | | 49/490.1 |
| 11,141,897 B2 * | 10/2021 | Hirokawa | B29C 48/21 |
| 2017/0217069 A1 * | 8/2017 | Hirokawa | B60J 10/33 |

FOREIGN PATENT DOCUMENTS

| CN | 108284459 A | * | 7/2018 | ............ B26D 1/04 |
| CN | 212147104 U | * | 12/2020 | |
| JP | 2009132045 A | * | 6/2009 | |
| JP | 2016155488 A | * | 9/2016 | |

* cited by examiner

*Primary Examiner* — Atul P. Khare
(74) *Attorney, Agent, or Firm* — Wenderoth, Lind & Ponack, L.L.P.

(57) ABSTRACT

A method for producing an extrusion molded product, wherein the method uses a holder (6) for feeding a core material (11), the holder (6) being provided with cutting guide holes (7) through which cutting blades (2) go to form grooves (12) in the core material (11); when rotary bodies (3) provided with the cutting blades (2) start rotating, the core material (11) and the holder (6) stand by at a predetermined standby position that does not enable the cutting blades (2) to cut the core material (11); and when the rotation speeds of the rotary bodies (3) reach predetermined rotation speeds, the holder (6) is or the rotary bodies (3) are moved so that the cutting blades (2) can start cutting the core material (11) proceeding through the holder (6), and then the cutting blades (2) form a plurality of grooves (12) in the core material (11).

3 Claims, 13 Drawing Sheets ic resin is always cut at the optimal rotation speeds and without raising the temperature of cutting blades; and a series of grooves are formed at arbitrarily spaced intervals.

METHOD FOR PRODUCING AN EXTRUSION MOLDED PRODUCT

BACKGROUND OF THE INVENTION

Field of the Invention

The present invention relates to a method for producing an extrusion molded product used as a weather strip, a trim, a sealing part or the like to be attached to an automobile, a two-wheeled vehicle, an outboard motor and so on.

DESCRIPTION OF THE RELATED ART

Such an extrusion molded product used as a weather strip, a trim, a sealing part or the like attached to an automobile, a two-wheeled vehicle, an outboard motor and so on comprises a core material, the material of which has, in recent years, been changed from metal to synthetic resin in order to meet the requirement of weight saving, the requirement of recycling and the like from the viewpoint of environmental conservation, and deal with the problem of the erosion of metal.

In order to form grooves in such a synthetic-resin core material of the extrusion molded product, there has been conventionally provided a method of cutting and forming grooves in the core material of synthetic resin by rotating rotary bodies provided with cutting blades, as shown, for example, by the under-listed Patent Literatures 1 and 2.

PRIOR ART DOCUMENT

Patent Literature 1: Japanese Patent Application Laid-Open Publication No. 2016-155488
Patent Literature 2: Japanese Patent Application Laid-Open Publication No. 2006-327562

SUMMARY OF THE INVENTION

Problem to be Solved by the Invention

According to the conventional producing methods disclosed in the above-mentioned Patent Literatures 1 and 2, however, in the early stage of extrusion molding, the right and left rotary bodies provided with cutting blades start rotating after the core material of synthetic resin goes through between the rotary bodies in the stationary state, and thus, cutting of the core material of synthetic resin starts before the rotation speeds of motors for rotating rotary bodies reach required rotation speeds from the rotation speeds at the time of starting rotations. Therefore, there have been problems that the rotary bodies may be prevented from rotating, depending on the shape of grooves formed in the core material and the hardness of the synthetic resin; burrs arise at the grooves formed in the core material; and each groove is formed in irregular shape.

Furthermore, since cutting blades attached on rotary bodies that rotate at a high speed cut a core material, there was a problem that when the temperature of the cutting blades rises because of friction, etc. at the time of cutting operation, the cutting blades expand and become weak, thereby preventing precise formation of grooves.

The present invention has been made to solve the above-mentioned problems, and provides a method for producing an extrusion molded product, wherein the rotary bodies provided with cutting blades do not stop rotation even immediately after they start rotating; the core material of synthetic resin is always cut at the optimal rotation speeds and without raising the temperature of cutting blades; and a series of grooves are formed at arbitrarily spaced intervals.

Means to Solve the Problems

The method for producing an extrusion molded product according to the present invention to solve the above-mentioned problems is characterized in that the method uses a holder (6) for supporting and feeding a core material (11) of synthetic resin extruded from an extrusion machine, the holder (6) being provided with cutting guide holes (7) formed on the right and left hand sides of the holder (6) such that cutting blades (2) are allowed to go through the cutting guide holes (7) and form grooves (12) on the right and left hand sides of the core material (11); the cutting guide hole (7) formed on the right hand side of the holder (6) and the cutting guide hole (7) formed on the left hand side of the holder (6) are shifted from each other with a gap (T) in the direction (X) in which the core material (11) is sent out; the method further uses cutting blade cooling members for cooling cutting blades (2); when rotary bodies (3) provided with the cutting blades (2) start rotating, the core material (11) and the holder (6) for feeding the core material (11) stand by at a predetermined standby position that does not enable the cutting blades (2) to cut the core material (11); and when the rotation speeds of the rotary bodies (3) reach predetermined rotation speeds optimal for the cutting blades (2) to cut the core material (11), the holder (6) is or the rotary bodies (3) are moved so that the cutting blades (2) can start cutting the core material (11) that is proceeding through the holder (6), and the cutting blades cooled by the cutting blade cooling members cut the right and left sides of the core material (11) such that the cutting blades (2) of the right hand side rotary body (3) that go through the cutting guide hole (7) formed on the right hand side of the holder (6) and the cutting blades (2) of the left hand side rotary body (3) that go through the cutting guide hole (7) formed on the left hand side of the holder (6) are shifted from each other with a gap (T) in the direction (X) in which the core material (11) is sent out, whereby the cutting blades (2) of the rotary bodies (3) form a plurality of grooves (12) in series at arbitrarily spaced intervals on the right and left hand sides of the core material (11).

Further, a method for producing an extrusion molded product according to the present invention is also characterized in that the cutting blade cooling members are water spray nozzles (8) for spraying water on to the cutting blades (2).

Furthermore, a method for producing an extrusion molded product according to the present invention is also characterized in that each of the water spray nozzles (8) is provided at a position above corresponding one of rotary bodies (3) provided on the right and left hand sides such as to cool the cutting blades (2) by spraying water on to an outer peripheral surface (32) of the rotary body (3) on which the cutting blades (2) are provided.

Advantageous Effects of the Invention

In the method for producing an extrusion molded product according to the present invention, when the rotary bodies start rotating, the holder for supporting and guiding the feeding of the core material stands by at a predetermined standby position that does not enable the cutting blades to cut the core material; and when the rotation speeds of the rotary bodies reach predetermined rotation speeds optimal for the cutting blades to cut the core material, the holder or the rotary bodies are moved so that the cutting blades can start cutting the core material supported and fed by the holder, and the cutting blades (2) provided on the rotary bodies (3) form a plurality of grooves (12) in series at arbitrarily spaced intervals on the right and left hand sides of the core material (11) under condition that the cutting blades are cooled by cutting blade cooling members.

Therefore, in the method for producing an extrusion molded product according to the present invention, when the rotation speeds of the rotary bodies provided with the cutting blades reach predetermined rotation speeds optimal for the cutting blades (2) to cut the core material (11), the cutting blades start cutting the core material supported and fed by the holder. This has solved the problem characteristic of the conventional method that shortage of the rotation speeds of the rotary bodies at the time immediately following the rotary bodies starting rotating causes defective cutting of the grooves in the core material and stoppage of the rotations of the rotary bodies. In this way, the present invention has realized stable producing of a core material according to which grooves of a desired shape are cut at desired spaced intervals in series in the core material, and the temperature of the cutting blades, even when it becomes high due to friction, etc. at the time of cutting operation, is cooled by cutting blade cooling members, thereby enabling precise cutting operation.

DETAILED DESCRIPTION OF THE PREFERRED EMBODIMENTS

Figure 1:
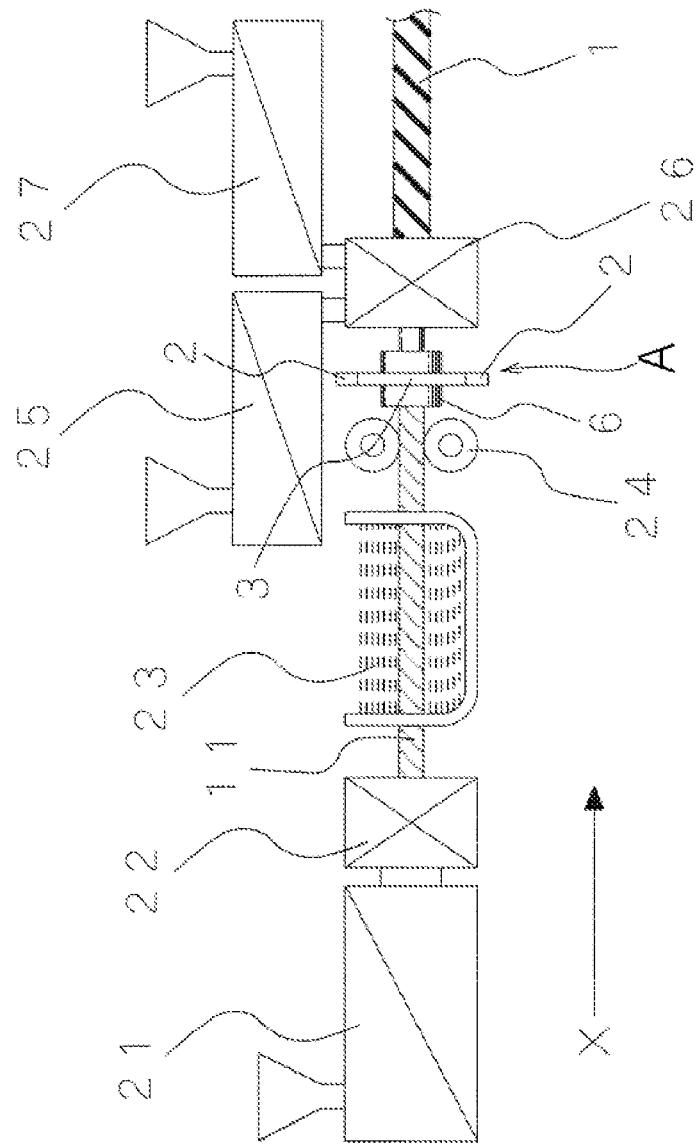
FIG. 1 is a side view of an example of the whole production process concerning a method for producing an extrusion molded product according to a preferred embodiment 1 of the present invention.

Preferred embodiments 1 and 2 of a method for producing an extrusion molded product according to the present invention will be described in detail hereinafter with reference to the accompanying drawings. The embodiments 1 and 2 described below are only examples of the present invention, and thus, the present invention, which is by no means limited to the embodiments 1 and 2, can be realized in all kinds of variants within the technical idea of the present invention.

A preferred embodiment 1 of a method for producing an extrusion molded product according to the present invention will be described while referring to the drawings.

[An Example of a Production Process for Working a Method for Producing an Extrusion Molded Product According to the Preferred Embodiment 1]

FIG. 1 shows an example of a production process for working a method for producing an extrusion molded product according to the preferred embodiment 1.

As shown by FIG. 1, in a preferred embodiment 1 of a method for producing an extrusion molded product according to the present invention, a thermoplastic resin injected in a first extrusion machine (21) is molded by a first mold die (22) into a core material (11) of synthetic resin having a substantially reverse-U-shaped cross section, proceeds through a first cooling tank (23), and is taken up by a first take-up roller (24), and then proceeds through a holder (6).

In this respect, the molded core material (11) may have, for example, a substantially reverse-U-shaped cross section, a substantially reverse-J-shaped cross section, a substantially I-shaped cross section or the like in order to have, according to the necessity, an optimal cross sectional shape for use as a weather strip, a trim, a sealing part or the like to be attached to an automobile, a two-wheeled vehicle, an outboard motor, and so on.

Figure 2:
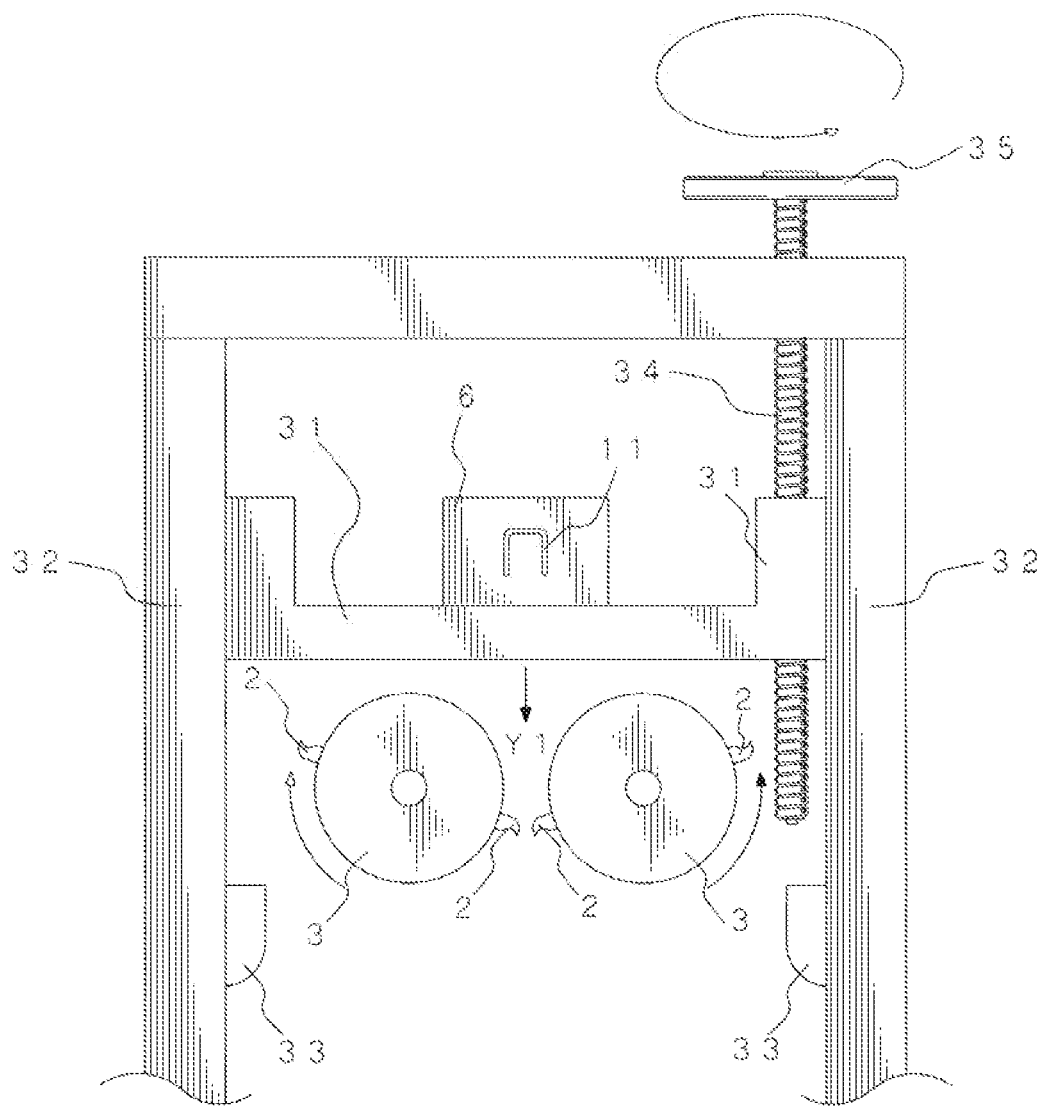
FIG. 2 is a structural example of a cutting mechanism part indicated as A in FIG. 1, showing, among other things, the state of the holder standing by at a predetermined standby position that does not enable the cutting blades to cut the core material.

Then, the core material (11), while proceeding through the holder (6), lowers together with the holder (6) as shown by FIG. 2, and is cut by a plurality of cutting blades (2) provided on outer peripheries of the rotary bodies (3) that rotate at right and left fixed positions where the rotary bodies (3) are installed. In this way, a plurality of grooves (12) of a desired shape are formed in series at desired spaced intervals on the right and left hand sides of the core material (11).

Here, optimal predetermined rotation speeds of the rotary bodies (3) in the preferred embodiment 1 are in the range of 1,000 rpm to 5,000 rpm, preferably 1,000 rpm to 3,000 rpm.

FIG. 2 shows a structural example of a cutting mechanism part indicated as A in FIG. 1, which comprises a holder (6) and rotary bodies (3) provided with a plurality of cutting blades (2).

As shown by FIG. 2, the cutting mechanism part indicated as A in FIG. 1 is designed such that the holder (6) supporting and feeding the core material (11) lowers, toward the rotary bodies (3) that rotate at right and left fixed positions where the rotary bodies are installed, up to a predetermined cutting starting position.

For that purpose, the holder (6) is installed and fixed on a table (31) that rises and lowers, and as shown by a structural example in FIG. 2, an operator grasps and turns a handle (35), which rotates a ball screw (34), thereby lowering the table (31) along guide rails (32) provided on the right and left sides of the table (31). In order to lower the table (31), there are various ways, namely, not only the way of an operator grasping and turning the handle (35) but also a way of turning a ball screw (34) by servomotors or the like and a way of lowering the table (31) by motors, hydraulic means or the like.

In order not to prevent the cutting blades (11), provided on the outer peripheries of the rotary bodies (3) that rotate at right and left fixed positions where the rotary bodies (3) are installed, from cutting the core material (11), the table (31) is provided with one or more slits (one or more openings) or one or more spaces so that the table (31) is not interfered with by the cutting blades (2) attached on the rotary bodies (3) provided on the right and left sides of the holder (6), by the rotary bodies (3) or by rotation axes (not shown in the Figures) about which the rotary bodies (3) are rotated.

Figure 3:
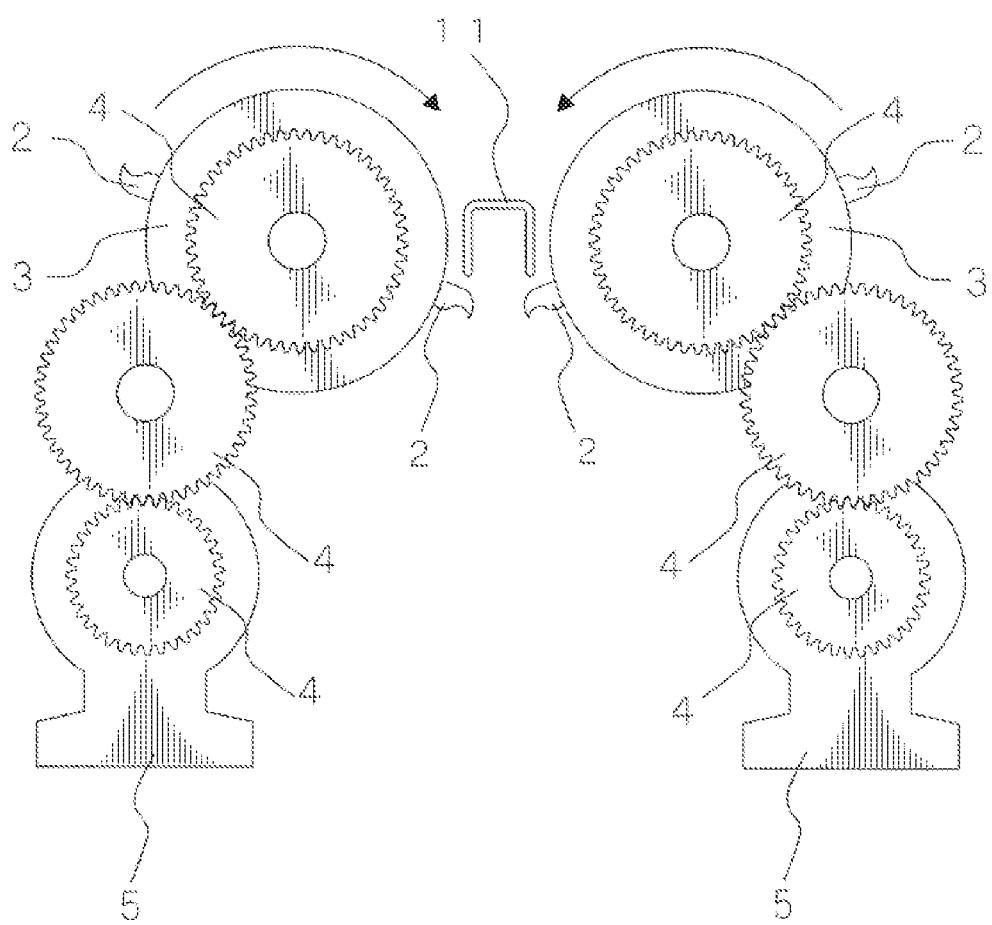
FIG. 3 is a front view showing a structural example of the rotary bodies disposed on both the right and left sides of the core material being rotated by servomotors in a method for producing an extrusion molded product according to a preferred embodiment 1 of the present invention.

FIG. 3 is a front view showing a structural example of a rotating mechanism for rotating the two rotary bodies (3).

In the preferred embodiment 1 of a method for producing an extrusion molded product according to the present invention, the two rotary bodies (3) provided with cutting blades (2) for cutting the core material (11) that proceeds through the holder (6) after being extruded, are rotated at the rotation speeds in the range of 1,000 to 5,000 rpm, preferably 1,000 to 3,000 rpm. In order to rotate the rotary bodies (3), there are provided, as shown by FIG. 3, servomotors (5) exclusively used for respective rotary bodies (3) disposed on the right and left sides of the core material (11). The construction of the rotation mechanism here is such that the rotation of each servomotor (5) is transmitted to respective rotary body (3) by way of a plurality of gears (4). FIG. 3 shows three gears, but the number of gears (4) is not limited to three. It should be noted that the construction of the rotation mechanism shown by FIG. 3 is merely an example, and thus, the number of gears (4) may be changed, and belts may, of course, be used instead of gears (4).

Here, the rotation speeds and the rotation start timings of the right and left servomotors (5) as well as the cutting start timing of the cutting blades (2) provided on the outer peripheries of the rotary bodies (3) are controlled by one or more controllers not shown in the Figures.

Furthermore, as shown by FIG. 3, on the outer peripheral surface of each rotary body (3), two cutting blades (2) are provided at circumferentially spaced intervals of 180 degrees. Here, the two cutting blades (2) may either be integrally formed with the rotary body (3) or may be firstly manufactured separately from the rotary body (3) and then attached to the rotary body (3). The number of the cutting blades (2) provided on each rotary body (3) may be one. However, it is better to provide a plurality of cutting blades (2) on each rotary body (3), and in that case, it is desirable to provide the cutting blades (2) at circumferentially equally spaced intervals in such a manner that the cutting blades are symmetrically disposed with respect to the center of rotation, but the number of the cutting blades (2) is not limited to two.

Figure 4:
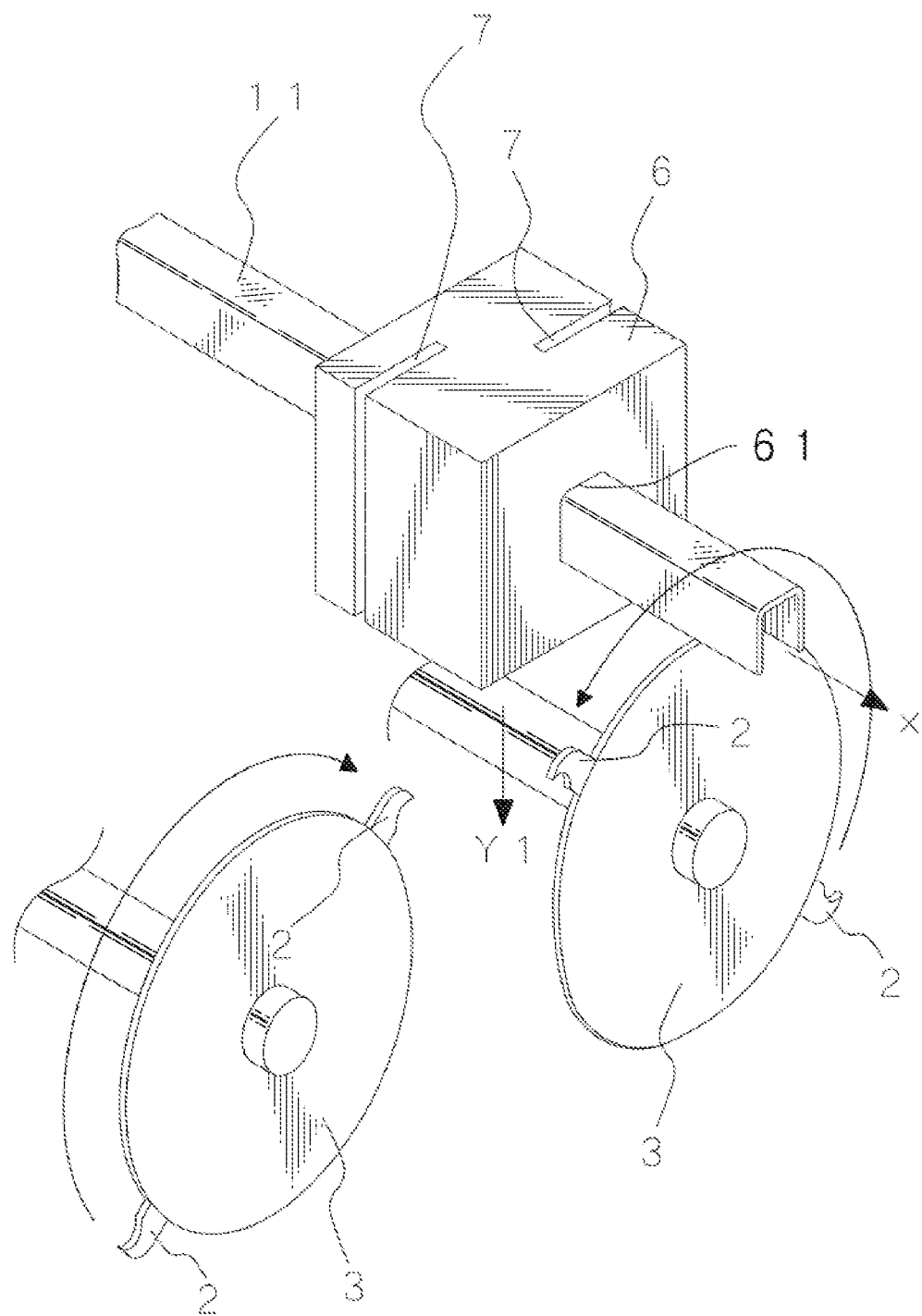
FIG. 4 is a perspective view enlargedly showing the state of the holder used in an example of a method for producing an extrusion molded product according to a preferred embodiment 1 of the present invention lowering toward between the right and left rotary bodies while feeding the core material.

FIG. 4 is a perspective view showing a state of the holder (6), used in the preferred embodiment 1 of a method for producing an extrusion molded product according to the present invention, lowering, while feeding the core material (11), toward between the rotary bodies (3) that rotate at right and left fixed positions lower than that of the holder (6)

As shown by FIG. 4, while the extrusion molded core material (11) is proceeding in the direction of X through the holder (6), the holder (6) is lowered by a lowering mechanism, as shown by FIG. 2, toward between the rotary bodies (3) that rotate at right and left fixed positions where the rotary bodies (3) are installed, up to a predetermined cutting start position.

In this respect, the holder (6), which supports and feeds the core material (11) of synthetic resin extruded by the extrusion machine, is provided with a core material feeding hole (61) formed therein in the direction of X and having the same reverse-U-shaped cross section as that of the core material (11) in order to increase the accuracy of the cutting blades (2) cutting the core material (11). The cross-sectional shape of the core material feeding hole (61) should not necessarily be one that corresponds to the cross-sectional shape of the core material (11).

However, if the cross-sectional shape of the core material feeding hole (61) is formed to correspond to the cross-sectional shape of the core material (11), there is a merit that when the cutting blades (2) are cutting the core material (11) that is going through the core material feeding hole (61), it is possible to restrain the core material (11) from vibrating and deviating, thereby enhancing the accuracy of cutting.

Further, the holder (6) is provided, on the right and left hand sides thereof, with cutting guide holes (7) each formed in a substantially rectangular shape in a front view, through which the rotary bodies (3) and the cutting blades (2) provided on the peripheries of the rotary bodies (3) are allowed to proceed, in order to form a desired shape of grooves (12) on the right and left hand sides of the core material (11).

Here, the core material feeding hole (61) is formed to have, for example, a substantially reverse-U-shaped cross section, a substantially reverse-J-shaped cross section, a substantially I-shaped cross section or the like that corresponds to the cross-sectional shape of the core material (11) to be cut, in order to support and feed the core material (11) without fail.

When the rotary bodies (3) start rotating, the core material (11) and the holder (6) that supports and feeds the core material (11), stand by at a predetermined standby position that is higher than the position where the rotary bodies (3) are provided, and does not enable the cutting blades (2) to cut the core material (11).

After that, when the rotation speeds of the rotary bodies (3) reach predetermined rotation speeds, i.e., 1,000 to 5,000 rpm, preferably 1,000 to 3,000 rpm that is optimal for the cutting blades (2) to cut the core material (11), the holder (6) is lowered by a lowering mechanism as shown by FIG. 2 in order for the cutting blades (2) to start cutting the core material (11) that is going through the holder (6).

Figure 5:
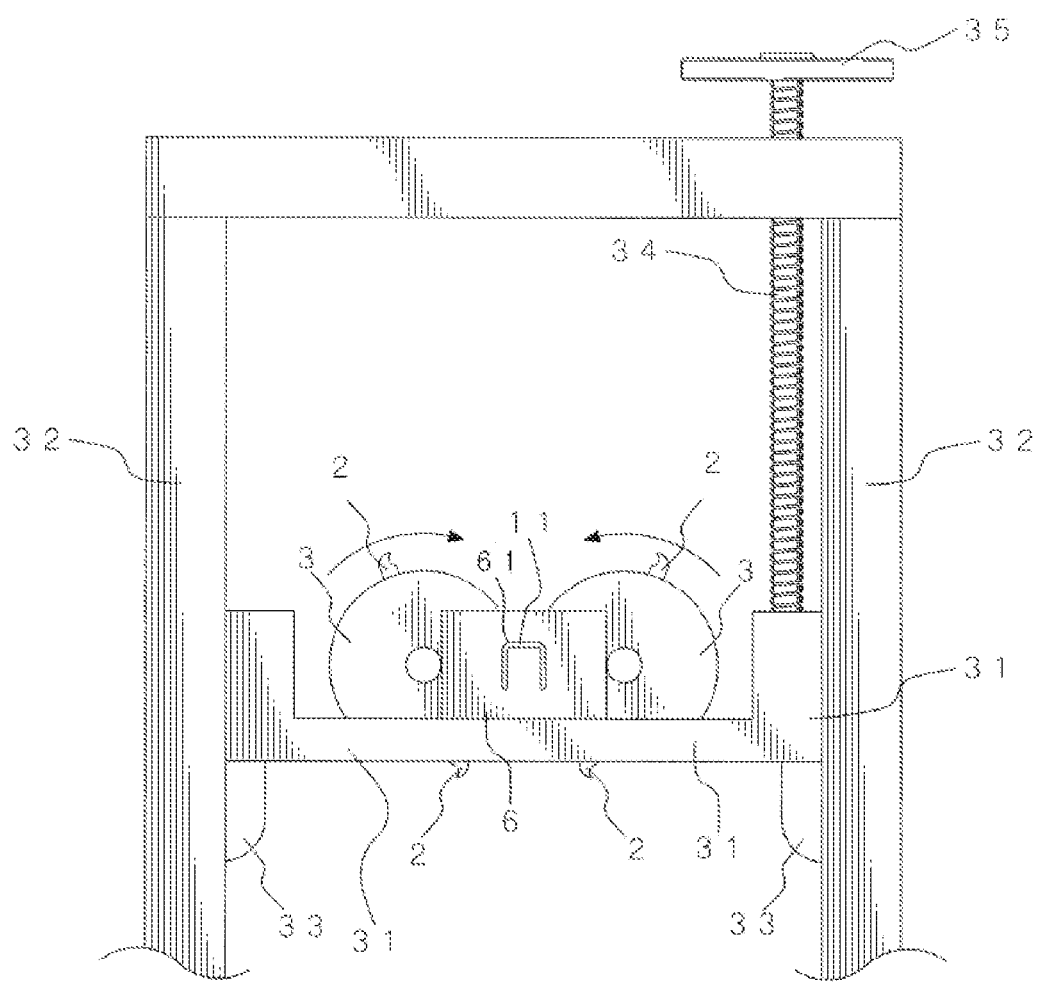
FIG. 5 is a structural example of a cutting mechanism part indicated as A in FIG. 1, showing, among other things, the state of the core material supported by the holder being cut by the cutting blades.

Specifically, as shown by FIG. 5, the table (31) lowers and stops at the position of a stopper (33), which allows the core material (11) going through the holder (6) in the direction of X to be cut by the cutting blades (2) provided on the rotary bodies (3) that rotate on the right and left sides of the core material (11), thereby forming a plurality of grooves (12) at certain intervals in series on the right and left hand sides of the core material (11), as described later.

Figure 6:
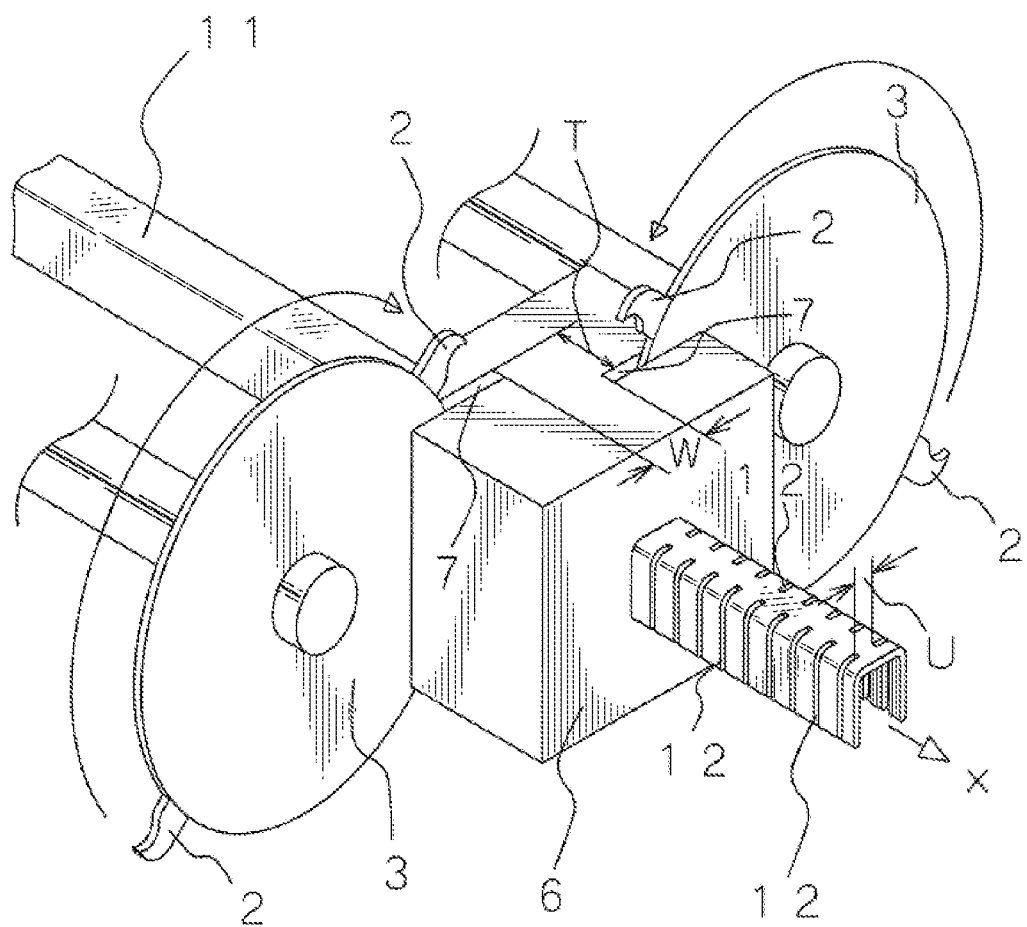
FIG. 6 is a perspective view showing a method for producing an extrusion molded product according to a preferred embodiment 1 of the present invention, indicating, among other things, the state of the core material supported by the holder being cut by the cutting blades and an example of the grooves formed in the core material.

FIG. 6 is a perspective view showing, by omitting the table (31) and the like, a state of the core material (11), going through the holder (6) indicated in FIG. 5 in the direction of X, being cut by the cutting blades (2) provided on the rotary bodies (3) that rotate on the right and left sides of the core material (11).

As shown by FIG. 6, the holder (6) is fixed at a predetermined position between the rotary bodies (3) that rotate on the right and left sides of the holder (6), and while the rotary bodies (3) are rotating, the cutting blades (2) provided on the outer peripheral surfaces of the rotary bodies (3) cut the core material (11) passing by cutting guide holes (7) provided on the right and left hand sides of the holder (6) while going through the holder (6) in the direction of X such that a desired shape of groves (12) are formed in series at desired spaced intervals.

In case of the embodiment shown in FIG. 6, a controller (not indicated in the Figure) connected to the right and left servomotors (5) for rotating the rotary bodies (3) controls the rotation speeds of the right and left servomotors (5), the timing to start rotating the servomotors (5), the cutting start timing for the cutting blades provided on the peripheral surfaces of the rotary bodies (3) to start cutting the core material (11), and the like. The core material (11) proceeding through the holder (6) in the direction of X is cut by the cutting blades (2) provided on the rotary bodies (3) that rotate on the right and left sides of the holder (6), thereby forming a plurality of grooves (12) in the core material (11) in such a manner that the grooves (12) are made at equally spaced intervals in the direction of X, and the grooves (12) made on the right hand side of the core material (11) are symmetrical to the grooves (12) made on the left hand side of the core material (11) such that each pair of the right and left grooves (12) are positioned on the same straight line.

Figure 7:
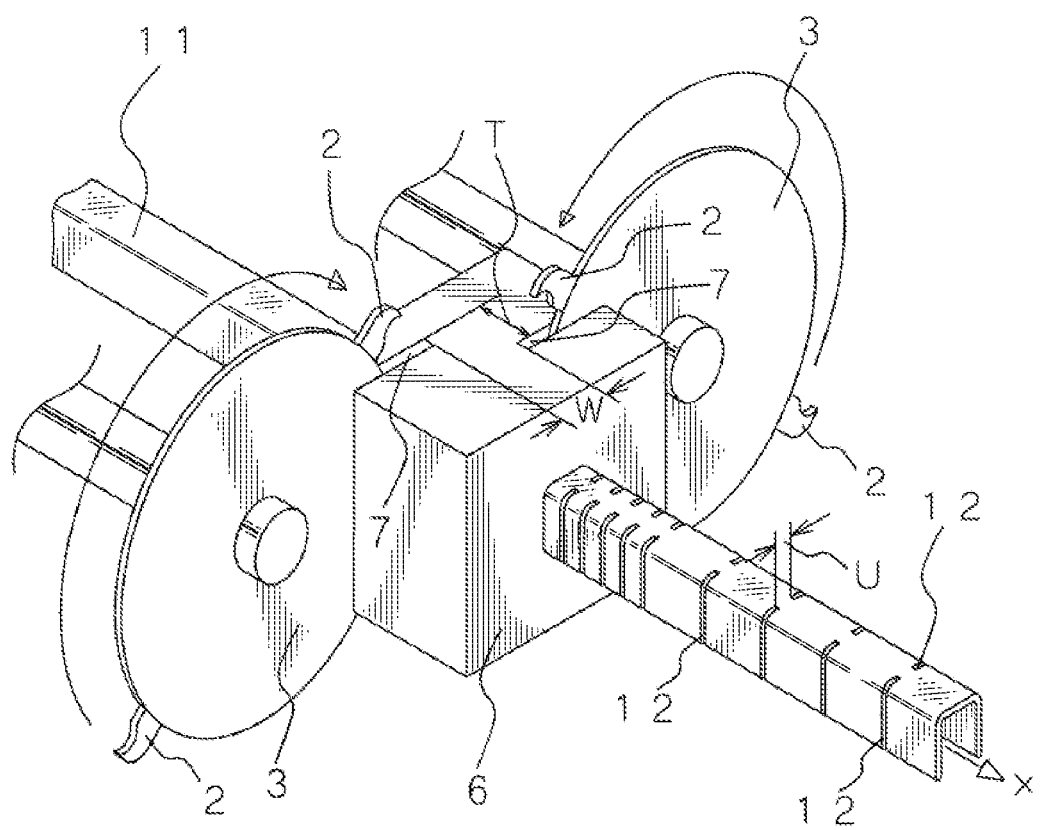
FIG. 7 is a perspective view showing a method for producing an extrusion molded product according to a preferred embodiment 1 of the present invention, indicating, among other things, the state of the core material supported by the holder being cut by the cutting blades and another example of the grooves formed (at differently spaced intervals) in the core material.
Figure 8:
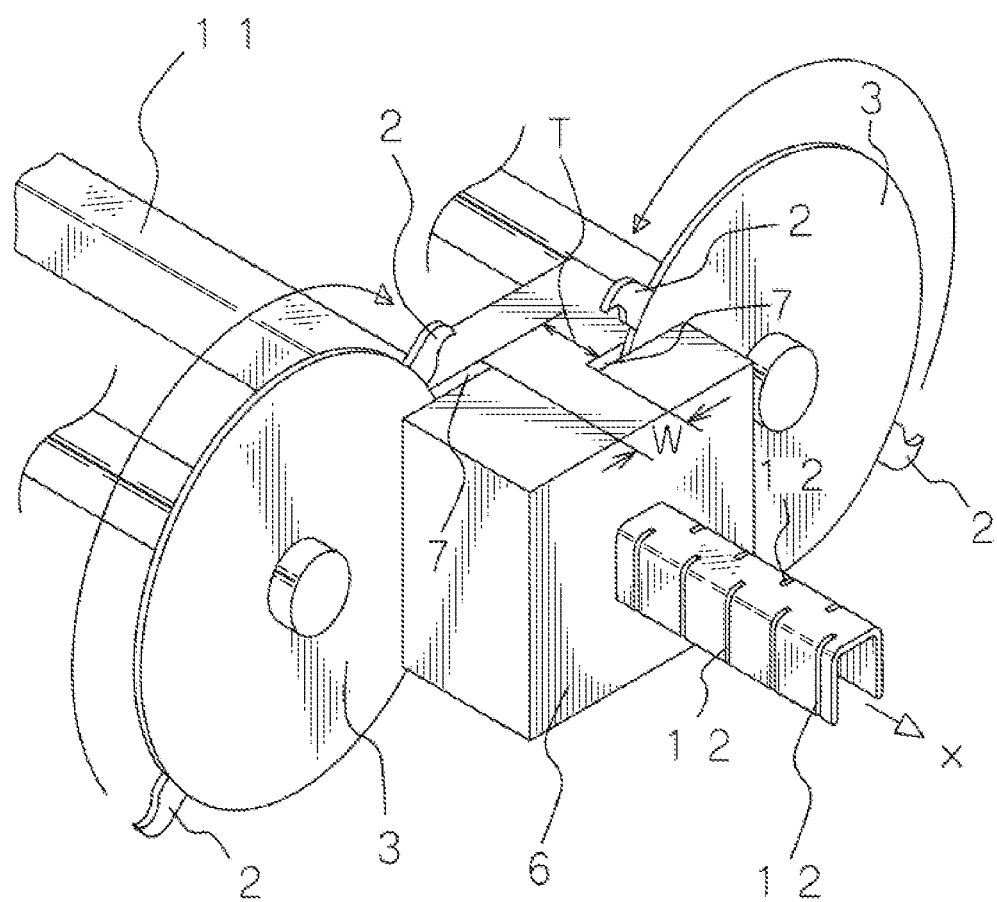
FIG. 8 is a perspective view showing a method for producing an extrusion molded product according to a preferred embodiment 1 of the present invention, indicating, among other things, the state of the core material supported by the holder being cut by the cutting blades and still another example of the grooves formed (such that the grooves on the right hand side of the core material are alternate with the grooves on the left hand side of the core material).

By controlling, with a controller (not indicated in the Figure) connected to the right and left servomotors (5) for rotating the rotary bodies (3), the rotation speeds of the right and left servomotors (5), the timing to start rotating the servomotors (5), the cutting start timing for the cutting blades provided on the peripheral surfaces of the rotary bodies (3) to start cutting the core material (11), and the like, it is possible to form the grooves (12) on the right and left hand sides of the core material (11) such that the grooves (12) are made at differently spaced intervals in the direction of X, and each pair of the right and left grooves (12) are positioned on the same straight line, as shown by FIG. 7. Furthermore, as shown by FIG. 8, it is also possible to form the grooves (12) such that the grooves formed on the right hand side of the core material (11) and the grooves formed on the left hand side of the core material (11) are not positioned on the same straight line, i.e., in such an alternate manner as to shift the positioning of the grooves (12) on the right hand side of the core material (11) and the positioning of the grooves (12) on the left hand side of the core material (11) in the direction of X, thereby making the grooves (12) on the right hand side of the core material (11) and the grooves (12) on the left hand side of the core material (11) asymmetrical to each other. Additionally, it is also possible, although this is not shown in any Figure, to form the grooves (12) such that the grooves (12) formed on the right hand side of the core material (11) and the grooves (12) formed on the left hand side of the core material (11) are positioned alternately, and at the same time, both of the grooves (12) on the right hand side of the core material (11) and the grooves (12) on the left hand side of the core material (11) are formed at arbitrarily differently spaced intervals in the direction of X.

Figure 9:
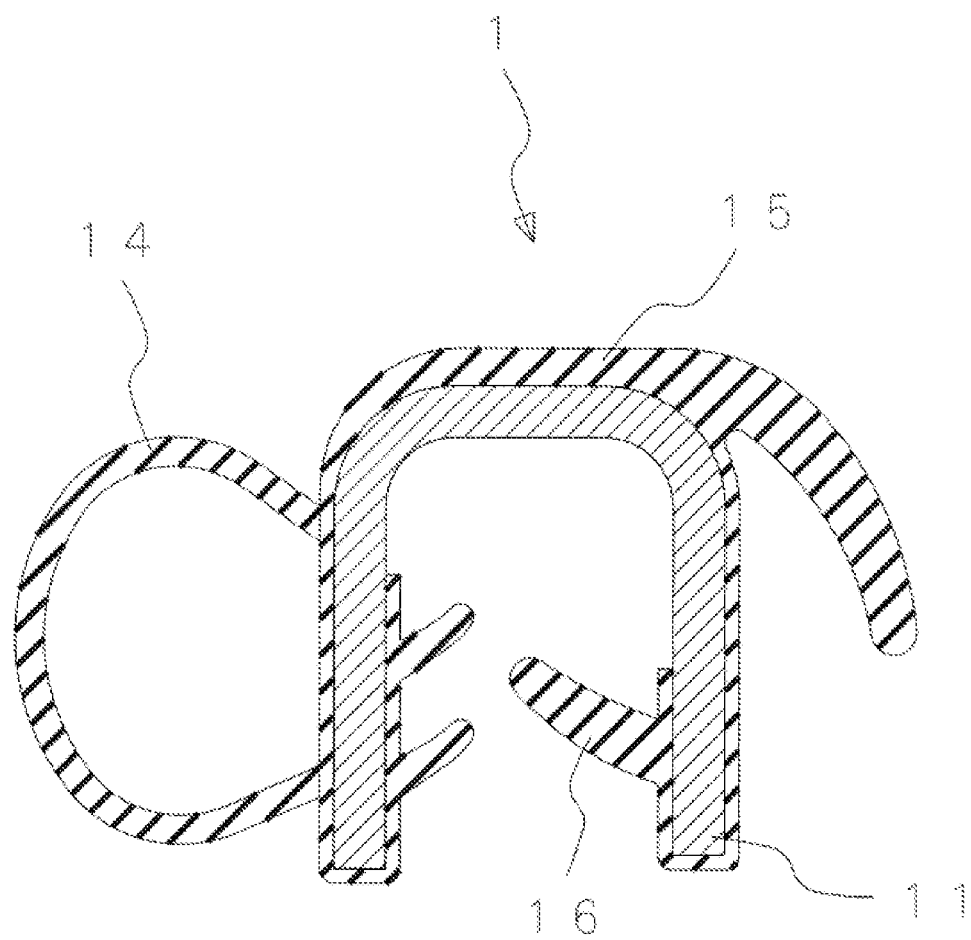
FIG. 9 shows a cross-sectional view of an example of a weather strip produced by a method for producing an extrusion molded product according to a preferred embodiment 1 of the present invention.

The core material (11), which has been cut, while passing through the holder (6), by the cutting blades (2) provided on the rotary bodies (3) that rotate on the right and left sides of the core material (11), to have a desired shape of grooves (12) at desired spaced intervals in series, goes into a second mold die (26), as shown by FIG. 1, and is extruded into an extrusion molded product (1), as shown by FIG. 9 for example, by using a thermoplastic elastomer injected in a second extrusion machine (25) to form a coating layer (15), and a soft thermoplastic elastomer injected in a third extrusion machine (27) to form a hollow seal (14).

FIG. 9 shows an example of a cross-sectional view of a weather strip produced by a method for producing an extrusion molded product according to the preferred embodiment 1 of the present invention.

An extruded molded product (1) shown in FIG. 9 comprises: a core material (11) of synthetic resin having a generally reverse-U-shaped cross-section and having grooves (12) formed on the right and left hand sides of the core material (11) as shown by FIGS. 6 to 8; a coating layer (15) of a thermoplastic elastomer formed on the periphery of the core material (11); a hollow seal (14) of a soft thermoplastic elastomer formed on an outer periphery of the coating layer (15); and lips (16) formed on the inner periphery of the core material (11) for mounting the core material (11) on a flange of an automobile body.

The synthetic resin to be used for a core material (11) can be an olefin resin such as a polypropylene resin having a type A durometer hardness (Shore A) of 85 or more, or a mixed synthetic resin obtained by mixing an olefin resin with 20 to 50% by weight of powder of talc or wollastonite.

As a thermoplastic elastomer to be used for the coating layer (15) and lips (16), an olefin resin having a type A durometer hardness (Shore A) of 40 to 80 is used, and as a soft thermoplastic elastomer to be used for the hollow seal (14), an olefin resin having a type A durometer hardness (Shore A) of 20 to is used.

Furthermore, if any other kinds of thermoplastic elastomers or synthetic resins are added to the core material (11), a fourth extrusion machine, a fifth extrusion machine, and the like are provided in addition to the second extrusion machine (25) and the third extrusion machine (27), and then are extruded together through the inside of the second mold die (26).

[Main Advantageous Effects of the Preferred Embodiment 1 of a Method for Producing an Extrusion Molded Product According to the Present Invention]

As described above, the preferred embodiment 1 of a method for producing an extrusion molded product according to the present invention is characterized in that the method uses a holder (6) for supporting and feeding a core material (11) of synthetic resin extruded from an extrusion machine; on the right and left hand sides of the holder (6) are formed cutting guide holes (7) which allow the rotary bodies (3) as well as the cutting blades (2) for forming grooves (12) on the right and left hand sides of the core material (11) to go through; when the rotary bodies (3) start rotating, the core material (11) and the holder (6) for feeding the core material (11) stand by at a predetermined standby position that does not enable the cutting blades (2) to cut the core material (11); when the rotation speeds of the rotary bodies (3) reach predetermined rotation speeds optimal for the cutting blades (2) to cut the core material (11), the holder (6) is lowered so that the cutting blades (2) can start cutting the core material (11) that is proceeding through the holder (6), and then the cutting blades (2) attached on the rotary bodies (3) form a plurality of grooves (12) in series at arbitrarily spaced intervals on the right and left hand sides of the core material (11).

Therefore, in the preferred embodiment 1 of a method for producing an extrusion molded product according to the present invention, when the rotation speeds of the rotary bodies provided with the cutting blades reach predetermined rotation speeds optimal for the cutting blades to cut the core material (11), the cutting blades (2) start cutting the core material (11) supported and fed by the holder (6). This has solved the problem characteristic of the conventional method that shortage of the rotation speeds of the rotary bodies at the time immediately following the rotary bodies starting rotating causes defective cutting of the grooves in the core material and stoppage of the rotations of the rotary bodies.

Consequently, the present invention has realized stable producing of a core material according to which grooves of a desired shape are formed at desired spaced intervals in series in the core material.

Particularly, in the preferred embodiment 1 of a method for producing an extrusion molded product according to the present invention, the core material feeding hole (61) is formed, through the holder (6), to have a reverse-U-shaped cross section that corresponds to the cross-sectional shape of the core material (11), and thus, there is a merit that when the cutting blades (2) are cutting the core material (11) that is proceeding through the core material feeding hole (61), it is possible to restrain the core material (11) from vibrating and deviating, thereby enhancing the accuracy of cutting.

In an embodiment of a method for producing an extrusion molded product according to the present invention, optimal predetermined rotation speeds of the rotary bodies (3) are in the range of 1,000 rpm to 5,000 rpm, preferably 1,000 rpm to 3,000 rpm.

Thus, in an embodiment of a method for producing an extrusion molded product according to the present invention, there is an advantageous effect that when the rotation speeds of the rotation bodies (3) are 1,000 to 5,000 rpm, the core material (11) is cut so as to form each groove (12) in a neat and beautiful shape.

Furthermore, in the preferred embodiment 1 of a method for producing an extrusion molded product according to the present invention, the rotations of the right and left rotary bodies (3) are controlled respectively by controlling the right and left survomotors (5), by which a plurality of grooves (12) are formed at arbitrarily spaced intervals on the right and left hand sides of the core material (11). In this respect, forming a plurality of grooves (12) at arbitrarily spaced intervals on the right and left hand sides of the core material (11) means forming a plurality of grooves (12) on the right and left hand sides of the core material (11) such that the grooves (12) formed on the right hand side and the grooves formed on the left hand side are symmetrical to each other or alternate with each other; or both of the grooves (12) on the right hand side and the grooves (12) on the left hand side are formed at differently spaced intervals in the direction of X; or in another way.

Therefore, in the preferred embodiment 1 of a method for producing an extrusion molded product according to the present invention, it is possible to control the rotation of each of the right and left rotary bodies (3) in a separate manner (independently) through the right and left servomotors (5) by using a computer program or the like, which enables the core material (11) to be cut, in an arbitrary way, such that a plurality of grooves (12) on the right and left hand sides of the core material (11) are formed at regularly spaced intervals or at irregularly (differently) spaced intervals; or the grooves (12) formed on the right hand side of the core material (11) and the grooves (12) formed on the left hand side of the core material (11) are symmetrical to each other, alternate with each other or in another way.

Furthermore, in the preferred embodiment 1 of a method for producing an extrusion molded product according to the present invention, the cutting blades (2) and each of the rotary bodies may be integrally formed right from the beginning, or may be separately produced before they are joined.

Therefore, in the preferred embodiment 1 of a method for producing an extrusion molded product according to the present invention, if the cutting blades (2) and each of the rotary goodies are integrally formed right from the beginning, the rotation of each rotary body (3) can be stabilized; and if the cutting blades (2) are produced such as to be attachable to the rotary bodies, a broken cutting blade can be dealt with by just replacing only the cutting blade part, which helps to reduce the costs involved with the replacement, thereby reducing the manufacturing costs of an extrusion molded product.

Furthermore, in the preferred embodiment 1 of a method for producing an extrusion molded product according to the present invention, there is a plurality of cutting blades (2) provided on each of the rotary bodies (3), which has an advantageous effect that even if the extrusion speed is increased while the rotary bodies (3) are rotating at a slow speed, grooves (12) can be properly formed in the core material (11).

Furthermore, in the preferred embodiment 1 of a method for producing an extrusion molded product according to the present invention, the core material (11) of synthetic resin may have a substantially reverse-U-shaped cross section, a substantially reverse-J-shaped cross section or a substantially I-shaped cross section.

Furthermore, in the preferred embodiment 1 of a method for producing an extrusion molded product according to the present invention, the cutting guide hole (7) formed on the right hand side of the holder (6) and the cutting guide hole (7) formed on the left hand side of the holder (6) are shifted from each other with a gap (T) in the direction (X) in which the core material (11) is sent out, as shown by FIGS. 6 to 8.

The reason why the cutting guide holes (7) of the holder (6) are shifted from each other with a gap (T) is as follows: if the gap (T), which is a positional difference in the direction of X between the cutting guide hole on the right hand side of the holder (6) and the cutting guide hole on the left hand side of the holder (6), is 0 mm, there is a problem that if the right and left rotary bodies (6) cut the core material

(11) to form grooves (12) therein, it means to form grooves (12) such that each pair of the right and left grooves (12) are located on a straight line, and in that case, if the set distance (U) between the grooves (12) formed on the right hand side of the core material (11) and the grooves (12) formed on the left hand side of the core material (11) is short, even an accidental shock at the time of cutting could break the portion of the core material (11) that lies between the right and left grooves (12), thereby causing the core material (11) to end up separating into parts or pieces.

However, in the preferred embodiment 1 of a method for producing an extrusion molded product according to the present invention, cutting guide holes (7) are provided on the right and left hand sides of the holder (6) such that the cutting guide hole (7) on the right hand side of the holder (6) and the cutting guide hole (7) on the left hand side of the holder (6) are shifted from each other with a gap (T) in the direction (X) in which the core material (11) is sent out. This construction avoids forming the grooves (12) on the right and left hand sides at the same time such that the grooves (12) on the right and left hand sides are located on a straight line, and ensures that the cutting process from the right hand side and the cutting process from the left hand side are performed with different timings. Thus, even when the width (U) between the grooves (12) to be formed on the right hand side of the core material (11) and the grooves (12) to be formed on the left hand side of the core material (11) is small, even an accidental shock at the time of cutting does not break the portion of the core material (11) that lies between the right and left grooves (12). Furthermore, the provision of the cutting guide holes (7) on the right and left hand sides of the holder (6) with a gap (T) can improve the strength and durability of the holder even when the width (W) between the cutting guide hole (7) on the right hand side of the holder (6) and the cutting guide hole (7) on the left hand side of the holder (6) is small.

[Other Examples (FIGS. 10 and 11) of Forming a Cutting Mechanism Portion A Shown by FIG. 1]

The above-mentioned preferred embodiment 1 was described as follows: As shown by FIGS. 2 to 5, when the rotary bodies (3) start rotating, each of the core material (11) and the holder (6) for supporting and feeding the core material (11) is at a position higher than that of the rotary bodies (3), and the cutting blades (2) provided on the rotary bodies (3) stand by at a predetermined standby position that does not enable the cutting blades (2) to cut the core material (11); and when the rotation speeds of the rotary bodies (3) reach predetermined rotation speeds optimal for the cutting blades (2) to cut the core material (11), the holder (6) is lowered from the predetermined standby position so that the cutting blades (2) can start cutting the core material (11) that is proceeding through the holder (6), and the cutting blades (2) provided on the rotary bodies (3) form a plurality of grooves (12) in series at arbitrarily spaced intervals on the right and left hand sides of the core material (11). However, the present invention is not limited to this. For example, as shown in FIG. 10, the present invention may also be realized as follows: when the rotary bodies (3) start rotating, each of the core material (11) and the holder (6) for supporting and feeding the core material (11) is at a position lower than that of the rotary bodies (3), and the cutting blades (2) provided on the rotary bodies (3) stand by at a predetermined standby position that does not enable the cutting blades (2) to cut the core material (11); and when the rotation speeds of the rotary bodies (3) reach predetermined rotation speeds optimal for the cutting blades (2) to cut the core material (11), the holder (6) is raised in the direction of Y2 from the predetermined standby position so that the cutting blades (2) can start cutting the core material (11) that is proceeding through the holder (6), and the cutting blades (2) provided on the rotary bodies (3) form a plurality of grooves (12) in series at arbitrarily spaced intervals on the right and left hand sides of the core material (11).

Figure 11:
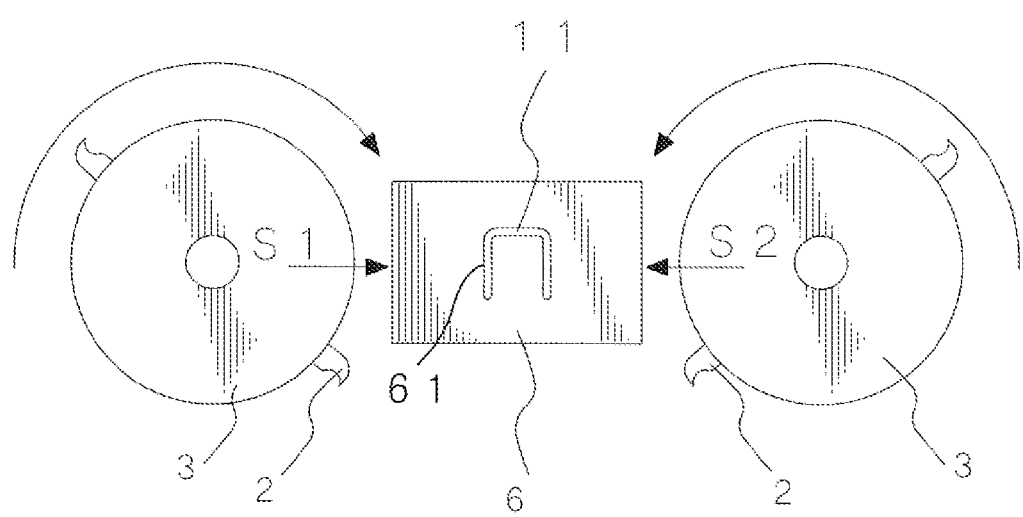
FIG. 11 is a front view showing a method for producing an extrusion molded product according to a preferred embodiment 1 of the present invention, wherein the rotary bodies move from the right and left standby positions toward the holder in order for the core material to be cut.

Furthermore, as shown by FIG. 11, the present invention may also be realized as follows: when the rotary bodies (3) start rotating, the core material (11) and the holder (6) for supporting and feeding the core material (11) are spaced apart from the positions where the right and left rotary bodies (3) are provided, and the cutting blades (2) provided on the rotary bodies (3) stand by at a predetermined standby position that does not enable the cutting blades (2) to cut the core material (11); and when the rotation speeds of the rotary bodies (3) reach predetermined rotation speeds optimal for the cutting blades (2) to cut the core material (11), the right and left rotary bodies (3) are moved, toward the holder (6), in the directions of S1 and S2 respectively from the predetermined standby positions so that the cutting blades (2) can start cutting the core material (11) that is proceeding through the holder (6), and the cutting blades (2) provided on the rotary bodies (3) form a plurality of grooves (12) in series at arbitrarily spaced intervals on the right and left hand sides of the core material (11).

Figure 10:
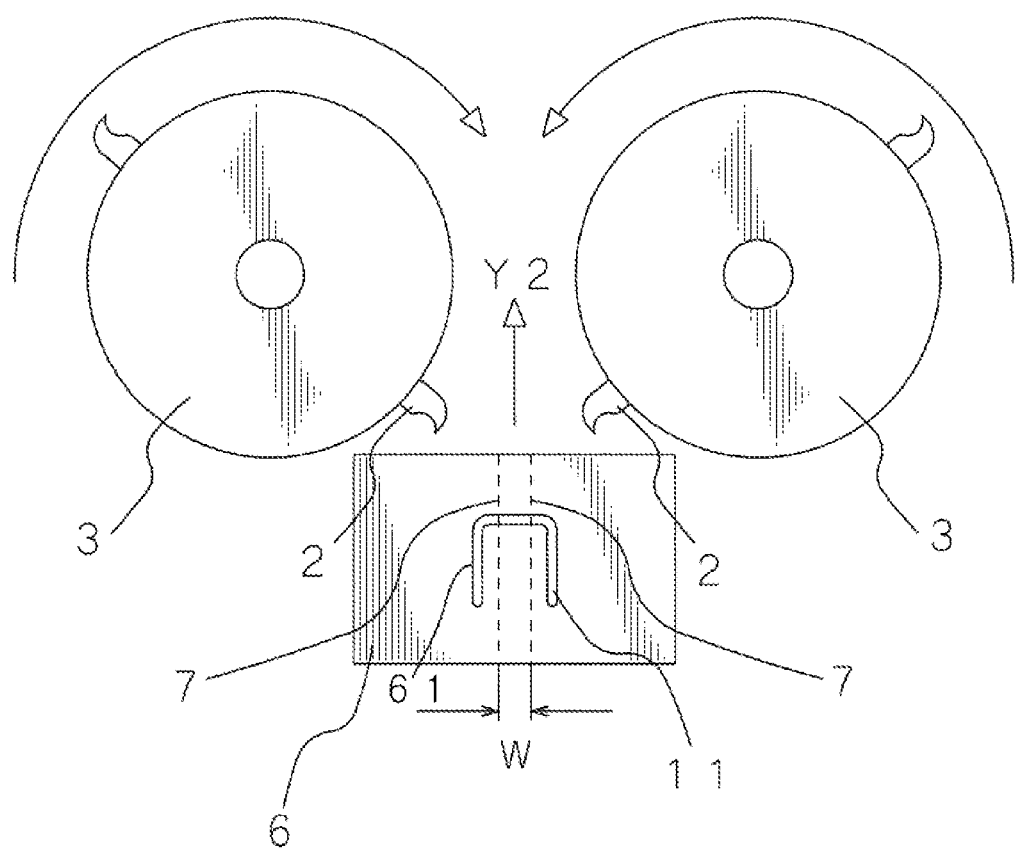
FIG. 10 is a front view showing a method for producing an extrusion molded product according to a preferred embodiment 1 of the present invention, wherein the holder rises toward between the right and left rotary bodies in order for the core material to be cut.

It should be noted that FIGS. 10 and 11 omit, among others, the table (31) on which the holder (6) is mounted and the ball screw (34) for moving the table (31), which are actually provided, in the same manner as in FIG. 2, in order to move the holder (6) in the direction of Y2 and move the rotary bodies (3) in the directions of S1 and S2 respectively.

A Preferred Embodiment 2

Next, a method for producing an extrusion molded product according to a preferred embodiment 2 of the present invention will be described in detail hereinafter with reference to the accompanying drawings.

A method for producing an extrusion molded product according to a preferred embodiment 2 is characterized by adding, to the manufacturing apparatus for working the method for producing an extrusion product according to the embodiment 1, water spray nozzles (8) for spraying water on to the cutting blades (2).

Figure 12:
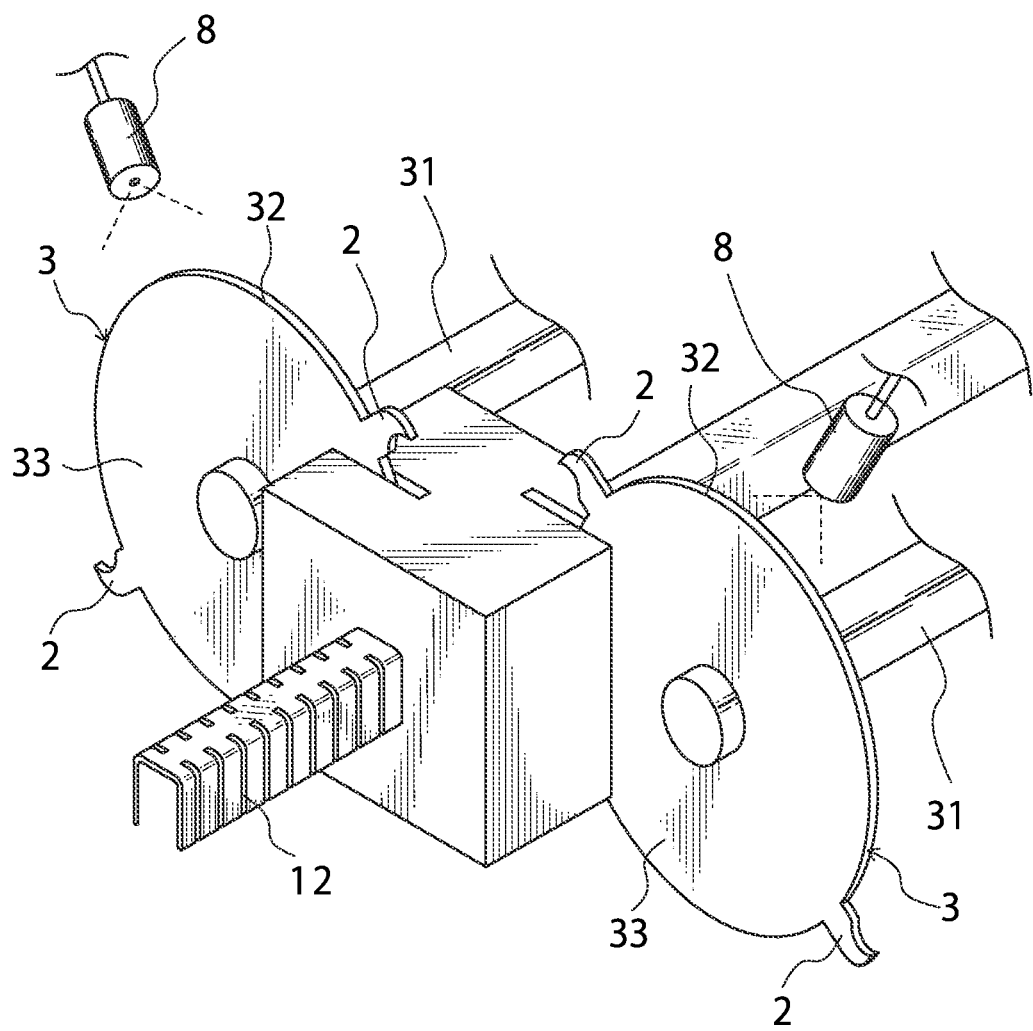
FIG. 12 is a perspective view showing a state of a core material supported by a holder being cut by cutting blades in a method for producing an extrusion molded product according to a preferred embodiment 2 of the present invention.
Figure 13:
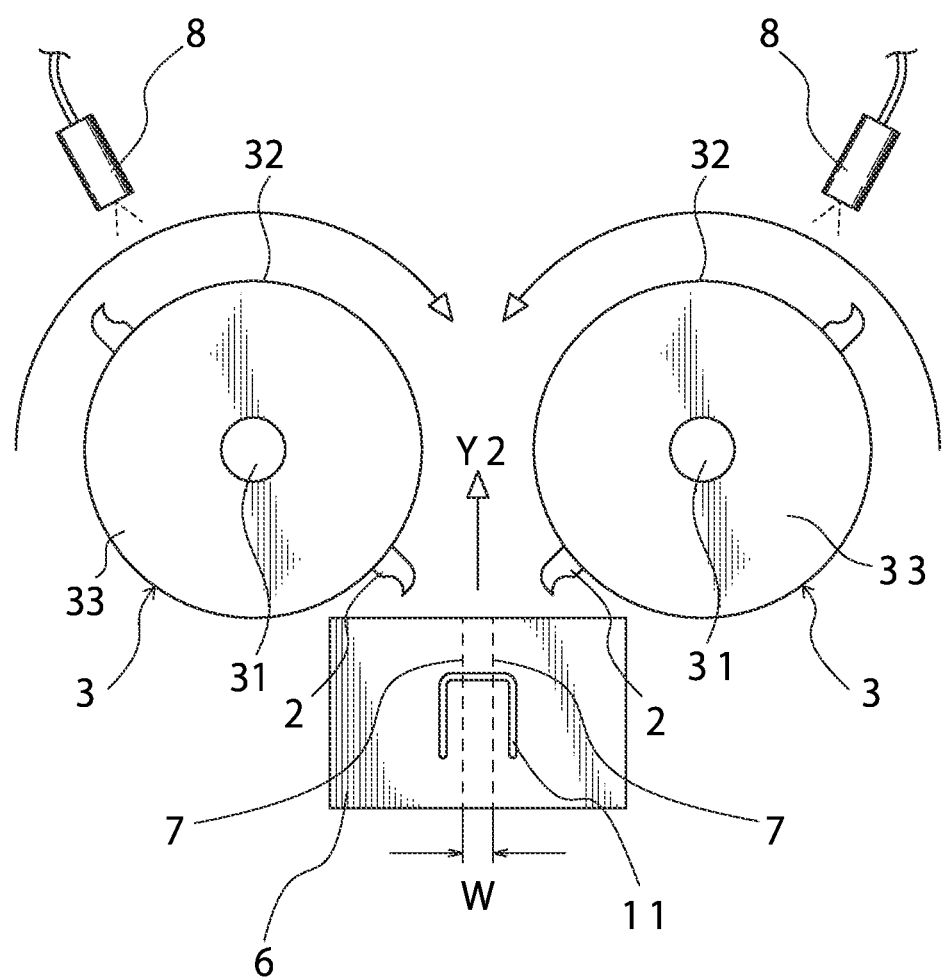
FIG. 13 is a front view showing a state of a core material supported by a holder being cut by cutting blades in a method for producing an extrusion molded product according to a preferred embodiment 2 of the present invention.

FIG. 12 is a perspective view showing a state, etc. of a core material supported by a holder being cut by cutting blades in a method for producing an extrusion molded product according to a preferred embodiment 2 of the present invention, and FIG. 13 is a front view of the same state, etc. For these Figures, description of the same structural parts as those of the aforesaid manufacturing apparatus for working the method for producing an extrusion product according to the preferred embodiment 1 is omitted, because the same reference numerals are also provided in these Figures.

As shown in FIG. 12 and FIG. 13, in a method for producing an extrusion molded product according to a preferred embodiment 2 of the present invention, a water spray nozzle (8) for spraying water on to the cutting blades (2) is provided at a position above each of the left and right rotary bodies (3). Each of the left and right water spray nozzles (8) is set at such an angle that it is directed in the direction vertically of the portion of a rotation shaft (31) which is located at a central portion of the corresponding rotary body (3), thereby to spray, at all times, water delivered under pressure from a pump, etc. (not shown in the Figures) on to an outer peripheral surface (32) of the corresponding rotary body (3). In this connection, the angle at which each of the water spray nozzles (8) is set is not limited to the above-mentioned angle, and it is also possible to set each of the water spray nozzles (8) at another angle if it is possible to spray water on to an outer peripheral surface (32) of the corresponding rotary body (3).

The cutting blades (2) are provided on an outer peripheral surface (32) of each of the rotary bodies (3). Therefore, when the water spray nozzle (8) sprays water, at all times, on the outer peripheral surface (32) of each of the rotary bodies (3), water can surely be sprayed on the cutting blades (2). This means that even when friction, etc. at the time of cutting operation makes the temperature of the cutting blades (2) become high, the cutting blades (2) can be cooled by the water sprayed from the water spray nozzle (8), and the friction, etc. at the time of cutting operation can be reduced by the water, thereby enabling the core material (11) to be cut precisely and the grooves (11) to be formed in series.

Specifically, in a method for producing an extrusion molded product according to a preferred embodiment 2 of the present invention, the left and right water spray nozzles (8) for spraying water on to the cutting blades (2) spray water at all times, from positions above left and right rotary bodies (3), on to the outer peripheral surfaces (32) of the rotary bodies rotating at a high speed, at such an angle that each of the water spray nozzles (8) is directed in the direction vertically of the portion of a rotation shaft (31) which is located at a central portion of the corresponding rotary body (3). The water sprayed on disk surfaces (33) of the rotary bodies (3) moves, by centrifugal force, to the cutting blades (2) by way of the outer peripheral surfaces (32) or to the cutting portions directly from the disk surfaces (33), thereby cooling the cutting blades (2) and reducing the friction, etc. at the time of cutting operation. In this way, the core material (11) can be cut precisely, and the grooves (12) can be formed in series.

In the above-mentioned description of a preferred embodiment 2, description was made such that each of the left and right water spray nozzles (8) sprays water delivered under pressure from a pump, etc. (not shown in the Figures), at all times, on to an outer peripheral surface (32) of the corresponding rotary body (3). However, the present invention is not limited to this, and the water may be sprayed, intermittently or at predetermined intervals, on to an outer peripheral surface (32) of the corresponding rotary body (3). Furthermore, description was also made such that water spray nozzles (8) for spraying water on to the cutting blades (2) are used as members for cooling cutting blades. However, in the present invention, the members for cooling cutting blades are not limited to the water spray nozzles. For example, the system for cooling cutting blades can, of course, be formed such that the cutting blades (2) of the rotary bodies (3) soak in water stored in one or more containers, etc. Also, oil can be used instead of water.

What is claimed is:

1. A method for producing an extrusion molded product, the method comprising:
    supporting and feeding a core material of synthetic resin by a holder, the core material extruded from an extrusion machine, and the holder being provided with a cutting guide hole formed on each of the right and left hand sides of the holder through which cutting blades provided on each of a left and right hand side rotary body go through to form grooves on respective right and left hand sides of the core material, wherein the cutting guide hole formed on the right hand side of the holder and the cutting guide hole formed on the left hand side of the holder are shifted from each other with a gap in an extrusion direction of the core material;
    cooling the cutting blades by spraying water from cooling members from above the cutting blades onto an outer peripheral surface of the rotary bodies; and
    starting rotation of the rotary bodies so as to reach predetermined rotation speeds while the core material and the holder stand by at a predetermined standby position that does not enable the cutting blades to cut the core material, wherein the holder and the rotary bodies are movable so that the cutting blades can start cutting the core material through the cutting guide holes after the rotary bodies reach the predetermined rotation speeds;
    wherein the cutting blades cooled by the cooling members cut the right and left sides of the core material such that the cutting blades of the right hand side rotary body that go through the cutting guide hole formed on the right hand side of the holder and the cutting blades of the left hand side rotary body that go through the cutting guide hole formed on the left hand side of the holder are shifted from each other with the gap in the extrusion direction of the core material, whereby the cutting blades of the rotary bodies form a plurality of grooves in series at arbitrarily spaced intervals on the right and left hand sides of the core material.

2. The method for producing an extrusion molded product according to claim 1,
    wherein the cutting blade cooling members are water spray nozzles for spraying the water on to the cutting blades.

3. The method for producing an extrusion molded product according to claim 2,
    wherein each of the water spray nozzles is provided at a position above corresponding to one of the rotary bodies provided on the right and left hand sides so as to cool the cutting blades by spraying the water on to the outer peripheral surface of the corresponding one of the rotary bodies on which the cutting blades are provided.

* * * * *